Dec. 9, 1969  D. G. SMITH  3,482,312
METHOD AND APPARATUS FOR MAKING DENTAL RESTORATIONS
Filed July 3, 1967  6 Sheets-Sheet 1

INVENTOR
Donald G. Smith

BY Shoemaker and Mattare
ATTORNEYS

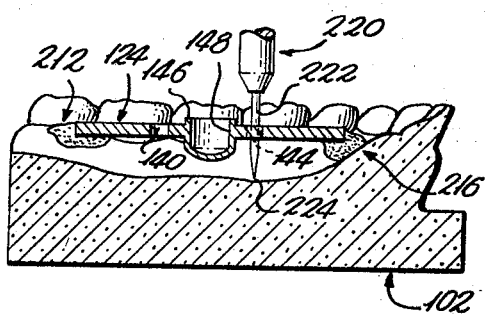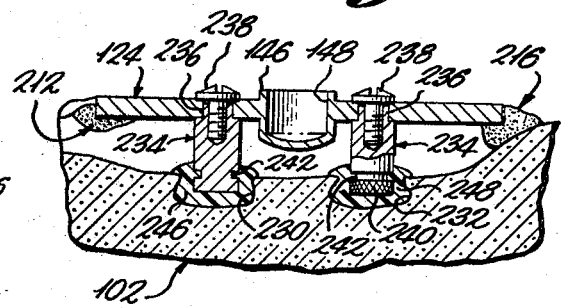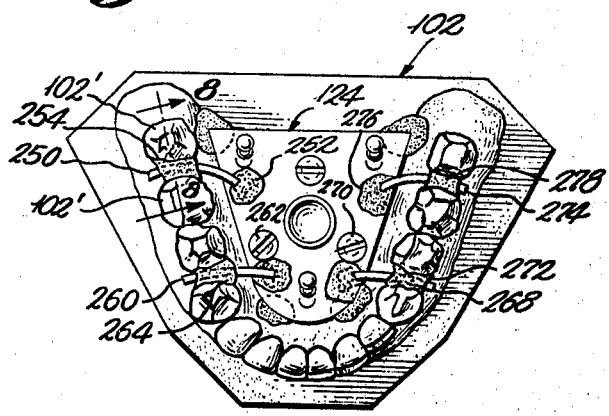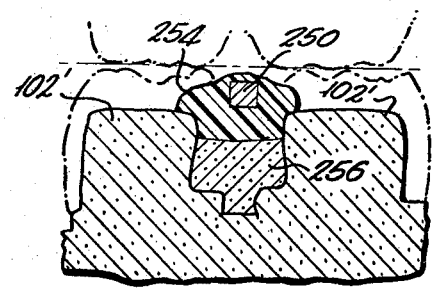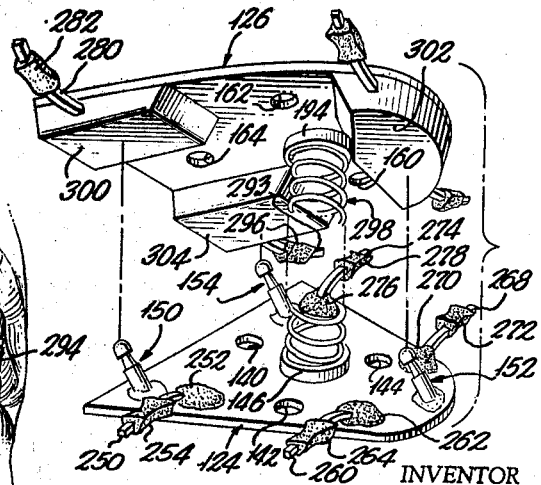
INVENTOR
Donald G. Smith
BY Shoemaker and Mattare
ATTORNEYS Dec. 9, 1969　　　　　D. G. SMITH　　　　　3,482,312
METHOD AND APPARATUS FOR MAKING DENTAL RESTORATIONS
Filed July 3, 1967　　　　　　　　　　　6 Sheets-Sheet 3
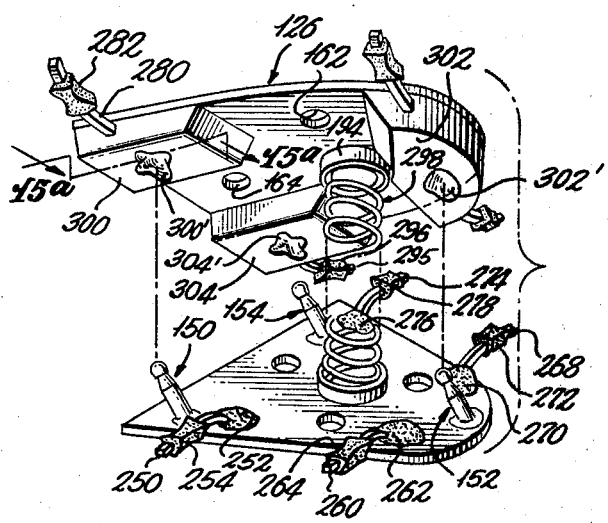
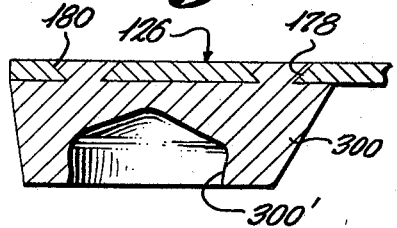
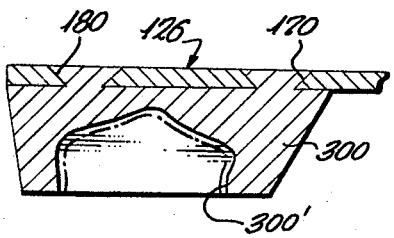
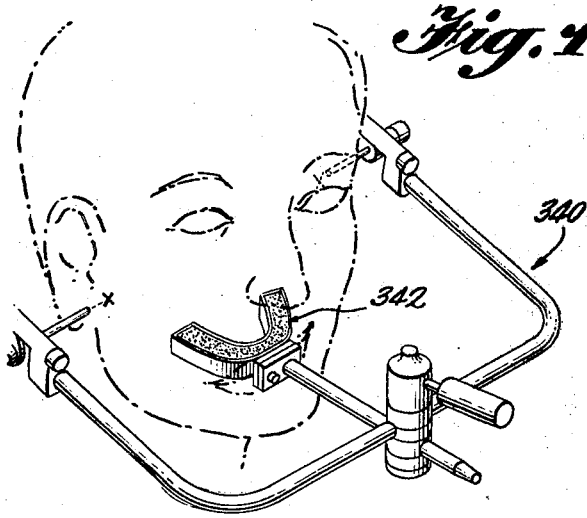
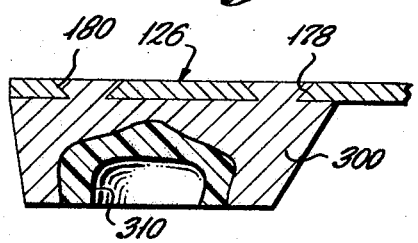
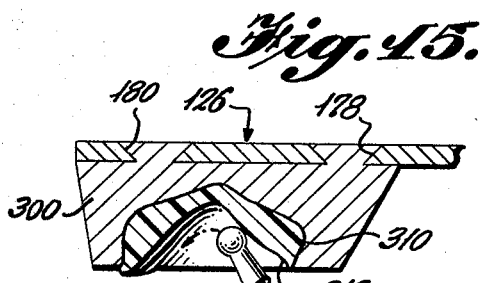
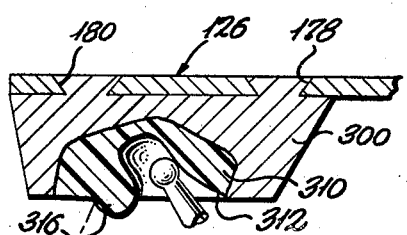
INVENTOR
Donald G. Smith
BY Shoemaker and Mattare
ATTORNEYS

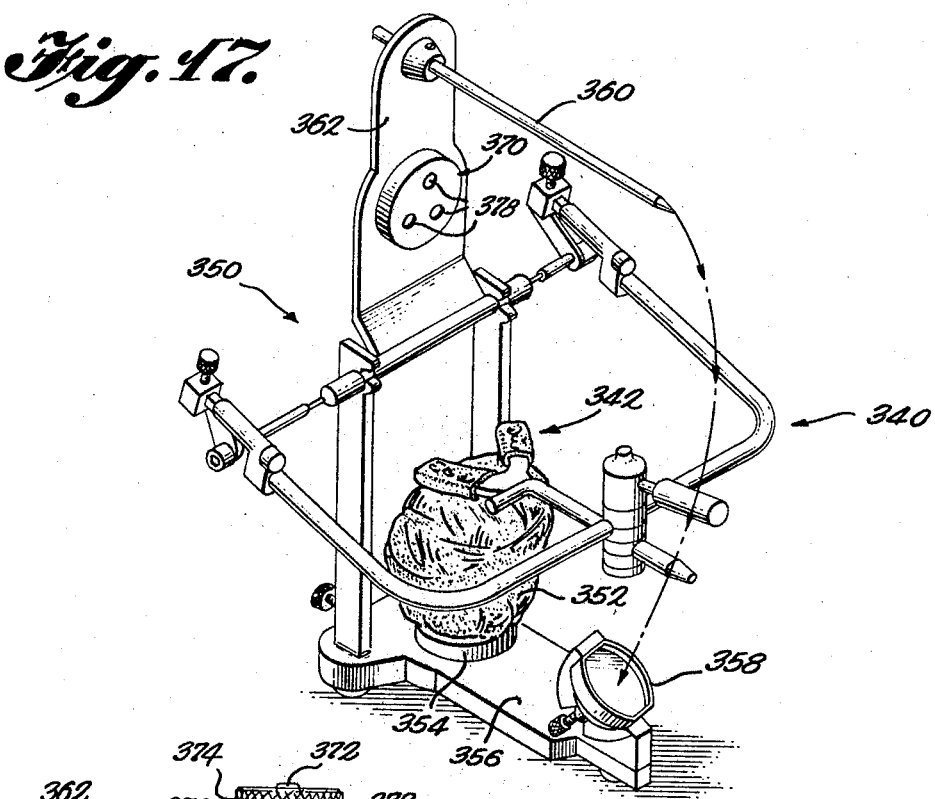

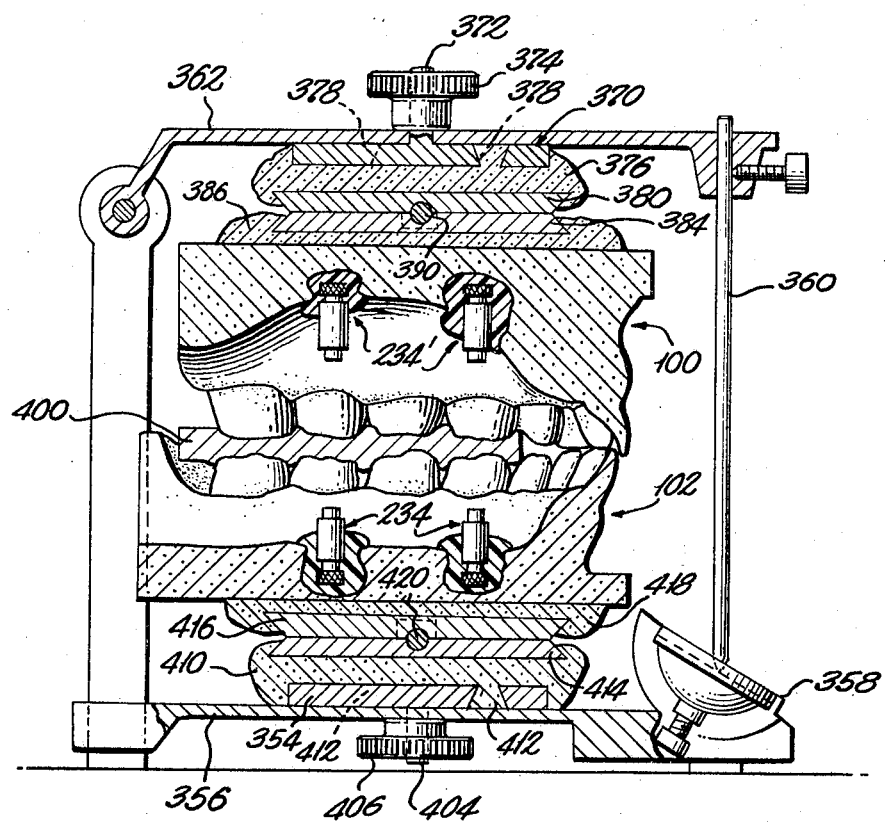

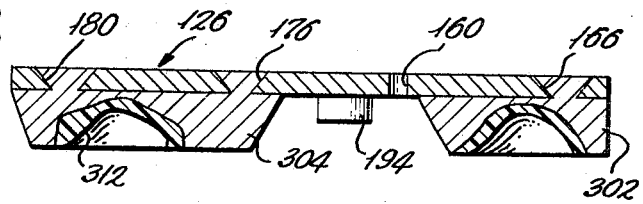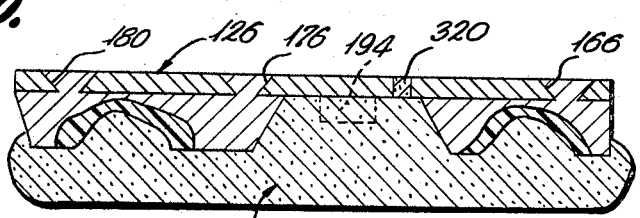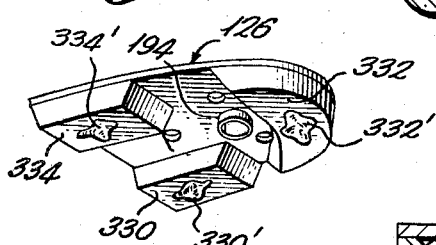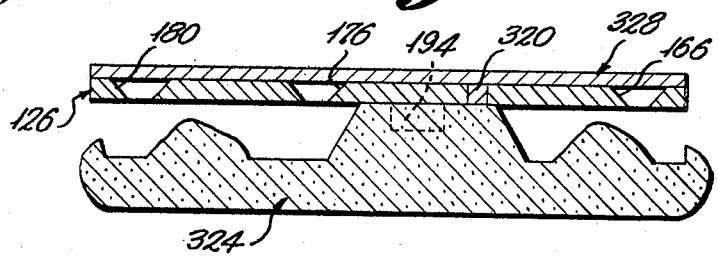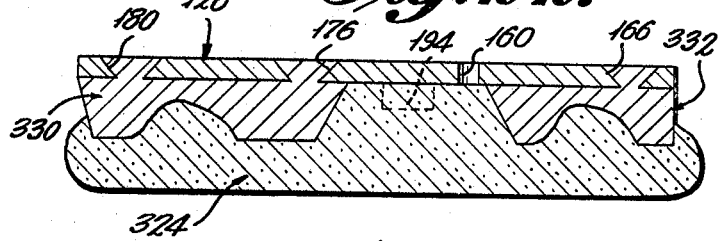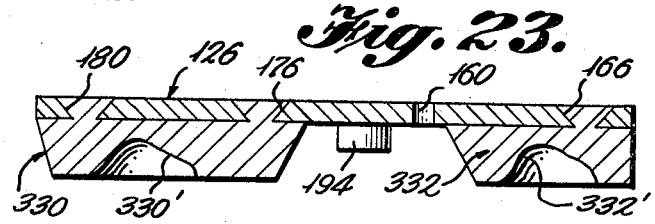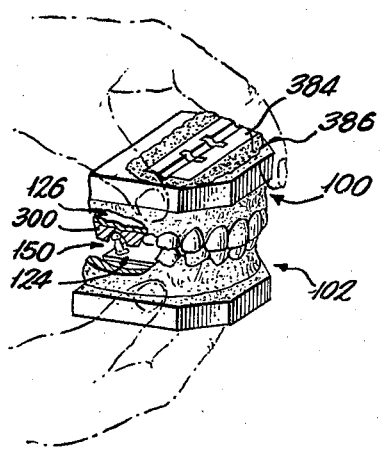

United States Patent Office 3,482,312
Patented Dec. 9, 1969

3,482,312
METHOD AND APPARATUS FOR MAKING
DENTAL RESTORATIONS
Donald G. Smith, Suite 301, Alhambra Circle,
Coral Gables, Fla. 33134
Filed July 3, 1967, Ser. No. 650,736
Int. Cl. A61c 9/00
U.S. Cl. 32—19                                31 Claims

ABSTRACT OF THE DISCLOSURE

Tracings of the jaw movements are made completely within the patient's mouth by means accurately positioned with respect to the patient's teeth. These tracings are attached to full arch models and manually manipulated through all required relative positions of the models and checked for centric relation contact in an articulator. Finished tooth surfaces are formed in wax which are then cast into gold or the like surfaces for living teeth.

BACKGROUND OF THE INVENTION

The present invention relates to method and apparatus for forming finished tooth surfaces in the form of inlays, crowns, bridges and the like for living teeth which are first ground away to receive such surfaces.

In the prior art, it has been the common practice to take wax or plaster records of different relative positions of the upper and lower jaws and these records are in turn used to set up an articulator whereupon the finished tooth surfaces are formed with the models in the articulator.

Where records are made only of certain relative positions of the upper and lower jaws, the accuracy of the method of forming the finished tooth surfaces is severely limited since it is impossible to properly reproduce the various jaw movements.

Additionally, where tracings of the jaw movements are made externally of the mouth, it is difficult to obtain the desired degree of accuracy, particularly in view of the fact that the models are then mounted in an articulator having specific degrees of limited movement which cannot reproduce all of the actual jaw movements.

Such prior art methods are relatively slow and time consuming, and when the models are mounted in an articulator, it is difficult to handle the models and to properly view them for forming the finished tooth surfaces.

SUMMARY OF THE INVENTION

In the arrangement of the present invention, tracings of all of the desired jaw movements are made directly in the mouth of the patient thereby enabling very accurate tracings to be made.

These tracings are subsequently employed for manually manipulating the models so as to enable a much greater degree of freedom of movement of the models so as to more nearly duplicate the actual jaw movements of the patient. This results in more accurate results than heretofore obtained.

The method according to the present invention enables a particular procedure to be carried out much faster than has been possible with prior art methods. Greater accuracy is obtained particularly due to the fact that the method of the present invention eliminates errors involved in setting up conventional articulators in positions other than centric.

The models are much easier to handle in the present invention and may be more readily viewed when manipulating them while forming the finished tooth surfaces.

Furthermore, the method of the present invention eliminates the necessity of transferring the recorded trace to any other instrumentality such as an articulator, but the trace itself serves to guide movement of the models when forming the finished tooth surfaces.

The apparatus of the present invention includes unique upper and lower tracing plates having cooperating structure which permits the tracing plates to be employed in the method of the present invention and to be effectively mounted within a patient's mouth to obtain the trace while in the patient's mouth. These tracing plates may also be readily attached to upper and lower full arch models for guiding the movement of the models when forming the finished tooth surfaces.

An object of the present invention is to provide new and novel method and apparatus for making dental restorations which provides more accurate results than heretofore obtainable and wherein the necessary procedures may be carried out in a much shorter period of time and in a more effective manner.

BRIEF DESCRIPTION OF THE DRAWINGS

FIG. 5 is a sectional view through the lower model and lower tracing plate illustrating the manner in which the lower model is marked for forming holes therein;

FIG. 6 is a view similar to FIG. 5 on an enlarged scale showing the way in which the attaching posts are secured to the model and the associated tracing plate;

FIG. 7 is a top view of the lower model and the associated lower tracing plate illustrating the manner in which guide portions are secured to the tracing plate and engage adjacent parts of the model;

FIG. 8 is a sectional view taken substantially along line 8—8 of FIG. 7 looking in the direction of the arrows;

FIG. 9 is a perspective view illustrating the top tracing plate in operative position within a patient's mouth;

FIG. 10 is an exploded perspective view illustrating the manner in which the upper and lower tracing plates are operatively associated with one another for insertion in a patient's mouth;

FIG. 11 is a view similar to FIG. 10 after a trace has been obtained in the tracing material mounted on the upper tracing plate;

FIGS. 12 through 15 are similar sectional views taken through the upper tracing plate and tracing material mounted thereon and illustrating subsequent steps in obtaining a final trace;

FIG. 15a is a view similar to FIG. 15 and taken along a line displaced to one side of the line along which the section of FIG. 15 is taken to illustrate the manner in which a lip is formed on the tracing material on the upper tracing plate;

FIG. 16 illustrates the step of making a face bow record with respect to the patient;

FIG. 17 illustrates the manner in which the face bow transfer is made to an articulator;

FIG. 18 illustrates the articulator arrangement as shown in FIG. 17 with the upper model mounted in place on the articulator;

FIG. 18a is a view similar to FIG. 18 illustrating the manner in which the lower model is mounted in place on the articulator with respect to the upper model while using a centric record for proper alignment;

FIGS. 19 through 23 are similar sectional views through the upper tracing plate illustrating subsequent steps involved in converting the final wax tracing to a metal tracing;

FIG. 24 is a bottom perspective view of the upper tracing plate with the tracings formed in metal; and FIG. 25 is a top perspective view illustrating the manner in which the models are manually manipulated with respect to one another to enable the final tooth surfaces to be formed thereon.

DESCRIPTION OF THE PREFERRED EMBODIMENTS

When making dental restorations, the teeth are first prepared as by grinding to receive inlays, crowns, bridges, etc.

After the teeth of the patient have been properly prepared, upper and lower full arch models are made in the usual well known manner.

Figure 1:
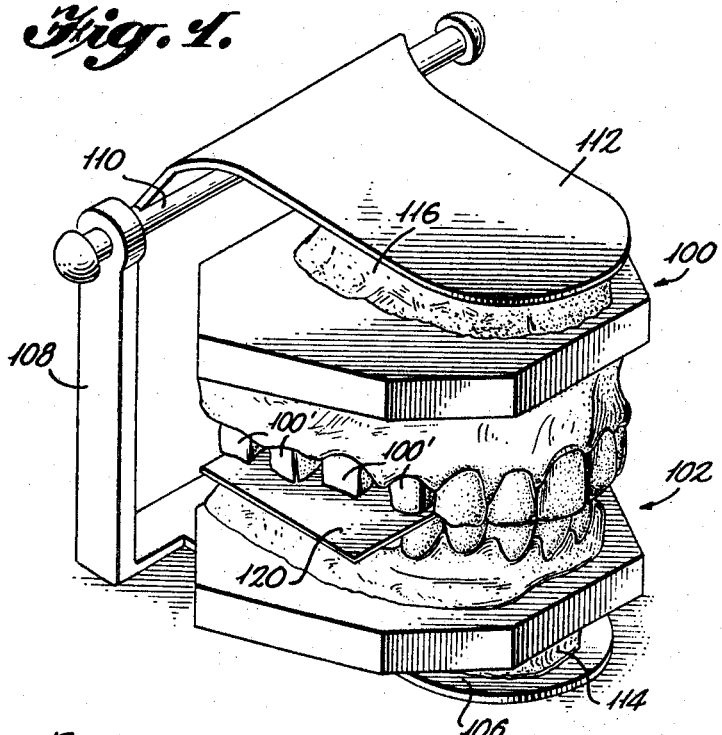
FIG. 1 is a top perspective view illustrating upper and lower full arch models mounted on an articulator and properly aligned with the aid of a centric record.

Referring now to the drawings wherein like reference characters designate corresponding parts throughout the several views, an upper full arch model is indicated generally in FIG. 1 by reference numeral 100, and a lower full arch model is indicated generally by reference numeral 102. As seen in this figure, the teeth represented by the portions indicated by reference numerals 100' of the upper model have been ground away.

A conventional simple articulator includes a base portion 106 having upwardly extending support portions 108 which pivotally support a cross pin 110 to which is secured the upper portion 112 of the articulator. The upper model 100 is secured to the undersurface of portion 112 of the articulator by a suitable body of material 116 which may be for example plaster. In a similar manner, the lower model 102 is secured to the upper surface of the base portion 106 of the articulator by a body of material 114 which may also be formed of plaster.

The upper and lower models are properly aligned with respect to one another and positioned on the articulator with the aid of a centric record indicated generally by reference numeral 120. This centric record is made in the usual manner and is interposed between the upper and lower models with the tooth impressions fitting within the impressions in the centric record so as to obtain proper registry of the upper and lower models in a well known manner. The centric record may be made at the same time as the impressions are made for the full arch models.

Figure 2:
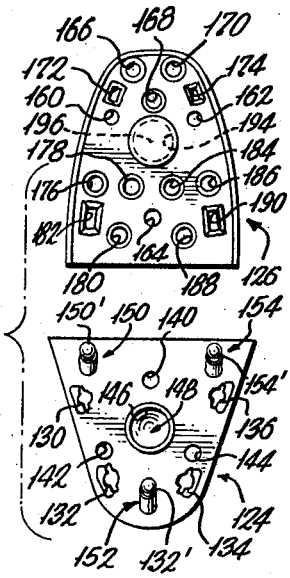
FIG. 2 is an exploded view illustrating the plan configuration of the upper and lower tracing plates.

Referring now to FIG. 2 of the drawings, a lower tracing plate is indicated generally by reference numeral 124, and an upper tracing plate is indicated generally by reference numeral 126. Each of these tracing plates are viewed from above so that the upwardly facing surfaces thereof are presented to view.

The lower tracing plate 124 includes four spaced irregularly shaped holes 130, 132, 134 and 136 formed therethrough. These holes are adapted to receive the inner ends of the support portions hereinafter described for mounting the support portions on the lower tracing plate and securing the support portions thereto.

The lower tracing plate also has three spaced holes 140, 142 and 144 formed therethrough. These latter three holes are adapted to cooperate with the posts hereinafter described for attaching the tracing plate to the lower model.

An annular wall portion 146 extends upwardly from plate 124 and defines therewithin a recess 148 for receiving the lower end of a spring hereinafter described.

Three spaced studs 150, 152 and 154 have the lower ends thereof secured as by soldering or the like to the tracing plate which is formed of a suitable metallic substance such as brass. These three studs slope upwardly at an acute angle to the tracing plate as seen more clearly in FIG. 3, and the upper ends 150', 152' and 154' of the three studs respectively are rounded and define portions of spherical surfaces for a purpose hereinafter described.

The upper tracing plate 126 has three spaced holes 160, 162 and 164 formed therethrough which are adapted to cooperate with the attaching posts hereinafter described for securing the tracing plate in operative position.

Three spaced generally circular holes 166, 168 and 170 are formed through the upper portion of the plate as seen in FIG. 2, each of these holes tapering to a smaller dimension towards the undersurface of the plate. Two generally rectangular holes 172 and 174 are formed adjacent holes 166 and 170 on either side of holes 168 and also taper to a smaller dimension toward the undersurface of the plate.

Circular holes 176, 178 and 180 are formed adjacent a rectangular hole 182 at the lower left-hand portion of the upper tracing plate as seen in FIG. 2, each of these holes tapering to a smaller dimension toward the undersurface of the plate. Similar circular holes 184, 186 and 188 as well as rectangular hole 190 are formed through the lower right-hand portion of the plate as seen in this figure, each of these holes also tapering to a smaller dimension in a direction toward the undersurface of the plate.

Formed on the undersurface of upper tracing plate 126 is an annular portion 194 which depends from such undersurface and defines a recess 196 for receiving the upper end of a spring hereinafter described.

Figure 3:
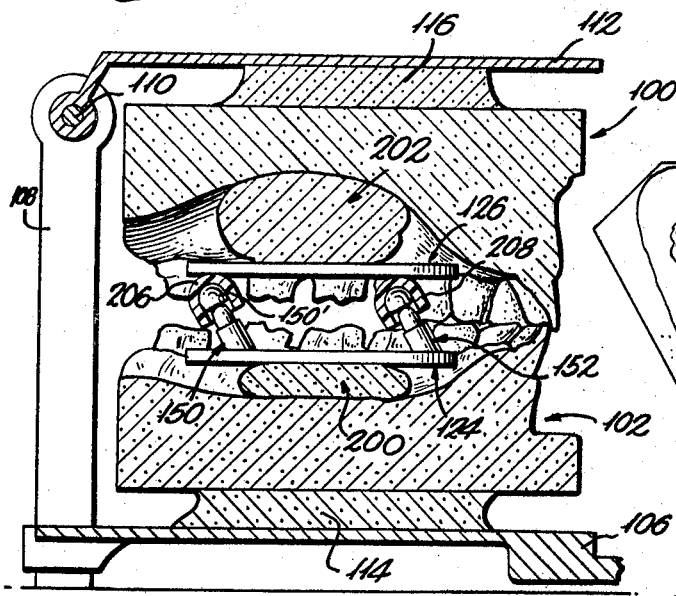
FIG. 3 is a sectional view through the articulator structure of FIG. 1 illustrating the manner in which the tracing plates are initially mounted on the associated models.

The next step in the method of the present invention is illustrated in FIG. 3. The centric record 120 has been removed. A plate 124 is supported and held in place relative to the lower model 102 by a mass of removable material such as clay indicated generally by reference numeral 200, plate 126 being similarly supported on the upper model 100 by a mass of clay indicated generally by reference numeral 202.

The plates are disposed so as to be substantially symmetrically disposed with respect to the associated models and are maintained in the proper spaced relationship illustrated by spacer members 206 and 208 which are disposed on the upper ends of studs 150 and 152 respectively, it being understood that a similar spacer member is disposed over the remaining stud 154 which is not visible in this view. These spacer members will maintain the upper ends of the studs spaced from the undersurface of the upper tracing plate 126 so that the studs can trace a proper pattern in tracing material supported on the undersurface of the upper tracing plate without bottoming against the upper tracing plate.

It will be understood that the spacer members will first be placed on the studs of the lower tracing plate and the tracing plates will then be positioned relative to the models so that the undersurface of the upper tracing plate is in contact with such spacers, the bodies of clay 200 and 202 being molded by hand so as to provide the proper spacing of the plates and positioning thereof relative to the associated models.

Figure 4:
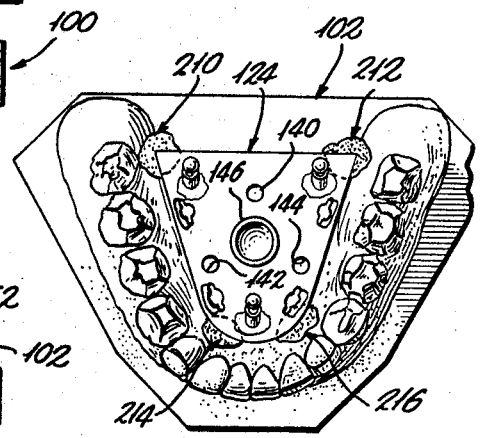
FIG. 4 is a top view illustrating the manner in which the lower tracing plate is tacked to the associated lower model.

Referring now to FIG. 4, the next step in the method of the present invention is illustrated. The purpose of this step is to tack the lower plate to the lower model so that it can be accurately located with respect to the lower model after the body of clay has been removed from beneath the lower tracing plate.

Four bodies of tacking material 210, 212, 214 and 216 are illustrated. These bodies of tacking material are in contact with the adjacent portions of the model and the undersurface as well as the side surfaces of the plate at the points illustrated. These portions of the plate are first lubricated with a suitable substance such as Vaseline or the like so that the tacking substance will not adhere to the plate. The tacking material may comprise acrylic resin or the like.

After the tacking material has been positioned as illustrated, the plate is lifted away from the associated model, and the body of clay 200 removed, whereupon the plate can be accurately repositioned with respect to the associated model by engaging the corner portions of the plate with the tacking material thereby obtaining an accurate register of the plate in its former position.

The same procedure is carried out with respect to the upper tracing plate and the upper model so that tacking material is added between the upper tracing plate and the upper model, whereupon the upper tracing plate is removed and the body of clay 202 thereupon taken away. The upper tracing plate is then again repositioned accurately with respect to the upper model by means of the associated tacking material.

Referring now to FIG. 5 of the drawings, the next step in the method is illustrated. As seen in this figure, the lower tracing plate 124 has been repositioned in accurate relationship to the lower model 102 by interengaging it with the associated tacking material. A marking tool indicated generally by reference numeral 220 has a lower metallic end portion 222 adapted to extend through each of the holes 140, 142 and 144 formed in the lower tracing plate, this lower end of the tool terminating in a sharp point 224 which is adapted to mark the model at positions which are to have holes formed therein.

Referring now to FIG. 6, undercut holes 230 and 232 have been formed in the lower model where marked for example by the tool extending through the holes 140 and 144 respectively of the lower tracing plate 124.

A pair of attaching posts 234 of similar construction are illustrated, each of these posts including a reduced upper end portion 236 which fit snugly within one of the holes formed in the lower tracing plate. The upper ends of each of these posts has a threaded bore formed therein which receives a threaded screw 238 whereby the posts are attached to the plate 124.

The lower ends of each of posts 234 may be knurled as indicated by reference numeral 240, and a circumferentially extending groove 242 is formed in the outer surface of such lower end portion.

Bodies of a suitable substance such as acrylic resin indicated by reference numerals 246 and 248 are then disposed within the undercut holes 230 and 232 respectively, this resin being initially placed in position in a fluid state and allowed to set, as is the tacking material previously described. While the bodies of material 246 and 248 are still in a fluid state, the plate 124 is returned to its position as shown in FIG. 6, and then allowed to stay in this position until the bodies of material 246 and 248 set or harden so as to permanently retain the attaching posts in operative position. It will be understood that three such attaching posts are operatively associated with the lower tracing plate to receive three screws 238 for attaching the lower tracing plate to the lower model.

A similar procedure is carried out with respect to the upper tracing plate and the upper model as illustrated in FIGS. 5 and 6 so that the upper tracing plate is secured to the upper model by three posts identical with post 234, these posts associated with the upper model fitting within the holes 160, 162 and 164 of the upper tracing plate so that the upper tracing plate may be attached to the upper model.

Referring now to FIGS. 7 and 8, guide portions are secured to the lower tracing plate, a first guide portion including a relatively rigid leg 250 formed of metal or the like the inner end of which is held in place within the hole 130 previously described by means of a body of material 252 of acrylic resin or the like which is allowed to set in this irregularly shaped hole to hold the member 250 in place.

Member 250 extends between prepared teeth 102', and a body of material such as acrylic resin 254 is tacked about member 250 and in overlying conforming contacting relationship with the adjacent prepared teeth as seen more clearly in FIG. 8 so as to provide a guide portion which is adapted to accurately register with this part of the model as well as the corresponding part of the patient's teeth.

Prior to placing the material 254 in the position shown, the adjacent portions of the model are lubricated with Vaseline or the like to prevent the material from sticking to the model. Here again, the body of material is initially placed in the position shown in a fluid condition and allowed to harden or set into its final shape as illustrated.

As seen in FIG. 8, certain portions 102' of the model may be undercut, and to avoid the guide portion 254 from becoming locked to the model, these undercut portions must first be filled in with a body of material indicated by reference numeral 256. This material may for example be clay or the like which remains in place while the guide portions are being formed, and which can be subsequently removed so that the final tooth surfaces can be made on the model. Accordingly, this body of material 256 will be employed only while the guide portion 254 is hardening, and after it has hardened, the material 256 will be removed. It of course will be understood that similar bodies of material may be employed wherever undercut portions of the model are encountered.

Referring again to FIG. 7, a rigid elongated member 260 extends between certain prepared teeth and has the inner end thereof secured within the hole 132 previously described by a body of material 262 which may be similar to material 252. A body of material 264 provides a guide portion and is formed similar to the body of material 254 and is in contacting conforming engagement with the adjacent parts of the model.

A further elongated rigid member 268 has the inner end thereof secured by a body of material 270 within the hole 134 previously described, and a body of material 272 provides a guide portion similar to those previously described.

A further elongated member 274 has the inner end thereof secured within the hole 136 previously described by a body of material 276. A further body of material 278 provides a guide portion in engagement with the adjacent associated parts of the lower model in a manner similar to that discussed hereinbefore.

It is accordingly apparent from an inspection of FIG. 7 that guide portions are secured to the lower tracing plate at spaced portions thereof, these guide portions being adapted to fit snugly against associated parts of the lower model as well as corresponding parts of the teeth of a patient.

In a similar manner, spaced guide portions are secured to the upper tracing plate following the same procedures as shown in FIGS. 7 and 8 so that the guide portions secured to the upper tracing plate will fit snugly against associated parts of the upper model as well as the corresponding parts of the patient's teeth whereby the upper tracing plate may be accurately registered with respect to the upper model and the patient's teeth.

As seen in FIG. 9, an elongated member 280 has the inner end thereof secured by a suitable body of material 281 within the hole 182 previously described. Referring to FIG. 10, a body of material 282 comprises a guide portion corresponding to those previously described.

As seen in FIG. 9, an elongated member 284 has the inner end thereof secured by a body of material 286 within the hole 172 previously described. A body of material 288 comprises a guide portion corresponding to those described in connection with FIG. 7. A further elongated member 290 has the inner end thereof secured by a body of material 292 within the hole 174 of the upper tracing plate, and a body of material 294 disposed about the outer portion of member 290 forms a guide portion similar to those previously described.

Referring to FIG. 10, a further elongated member 295 is secured by a suitable body of material within the hole 190 previously described, and a body of material 296 disposed thereon comprises a guide portion corresponding to those previously described.

After the upper tracing plate is provided with the associated guide portions, the two tracing plates are unscrewed from the posts secured to the associated models and the upper and lower tracing plates are positioned within the patient's mouth as seen in FIG. 9. The guide portions are adapted to register with parts of the patient's teeth so that the two tracing plates can be accurately positioned within the patient's mouth, the two tracing plates being maintained in place by means of a compression spring 298, the upper end of which is seated within the recess 196 of the upper tracing plate and the lower end of which is seated within the recess 148 of the lower tracing plate. This spring will apply continuous pressure on the two plates urging the guide portions secured thereto into engagement with the associated teeth.

After the upper and lower tracing plates have been inserted in the patient's mouth as seen in FIG. 9, all lateral and eccentric excursions of the jaws are attempted, and any interference of the plates or the support portions associated therewith is trimmed off so that all lateral and eccentric excursions of the jaws are accommodated.

The upper tracing plate is then removed from the patient's mouth, and as seen in FIG. 10, three bodies of tracing material indicated by reference numerals 300, 302 and 304 are secured to the upper tracing plate. The round tapered holes previously described in connection with FIG. 2 of the drawings receive portions of these bodies of tracing material to hold the tracing material in place on the upper tracing plate. This tracing material may comprise a conventional dental modeling compound.

After having placed the tracing material in place on the upper tracing plate as seen in FIG. 10, the upper tracing plate is again inserted in the patient's mouth, and the spring 298 as seen in FIG. 9 is positioned between the two tracing plates so that the two tracing plates are held in the proper operative position within the patient's mouth.

The patient then closes his mouth until the upper and lower front teeth contact each other. As the patient so closes his mouth, the upper rounded ends of the studs on the lower tracing plate enters into the bodies of tracing material supported on the undersurface of the upper tracing plate within his mouth. The necessary movements of the jaws are then made to generate paths or a trace pattern in the trace material.

FIGURE 11 illustrates the manner in which trace patterns 300′, 302′ and 304′ are formed in the bodies of tracing material 300, 302 and 304 respectively by such movements of the jaws.

Referring to FIG. 12, a section is taken through the body of tracing material 300, and the trace pattern 300′ is shown in cross section. After this initial trace pattern is made in the dental modeling compound, the compound is suitably chilled and then approximately 1 millimeter of the compound is relieved or cutaway as shown in FIG. 13. In other words, the initial traced pattern as indicated by the phantom line in FIG. 13 is cutaway to the full line position shown in this figure.

Referring now to FIG. 14, a body of stable tracing wax indicated by reference numeral 310 is then added to the relieved surface of the trace pattern formed in the body of material 300. After this stable tracing wax has been added, the upper tracing plate is again returned to the patient's mouth and the proper paths and trace pattern is slowly generated as illustrated in FIG. 15 to provide the final trace pattern surface 312. This trace pattern is formed by guided border movements of the jaws with downward pressure on the mandible to cause the masticatory muscles to seat the condyles in the bases of the associated fossae.

Additional wax may be added and the paths retraced until certain that the seated condyle relations and border movements and all areas in between are definite and correct. It is important to be certain that a posterior lip 316 is formed in the finished wax trace pattern on all three bodies of tracing material. This lip 316 is clearly seen in FIG. 15a. It should be understood that the section seen in FIG. 15 is directly through the center of the body of material 300, while the section as seen in FIG. 15a is disposed to one side or the other of the center of this body of material. The dotted line 318 as seen in FIG. 15a indicates the arc described by the upper end of the associated stud as the lower jaw is opened about its hinge axis. In other words, the lip will not be present at the center rear portion of each of the tracings since the studs will move in an arc when the lower jaw is opened in the centric position.

It should be noted that since the studs slope rearwardly or to the left as seen in FIGS. 12 through 15 inclusive, they will generate a lip or ridge on the rear edge of the bodies of tracing material and this lip will act as a backstop and guide against which the studs will be guided in lateral movements and not allowed to lift out when the models are manually manipulated as hereinafter described.

After the final trace pattern has been formed in the tracing material, the tracing plates are removed from the patient's mouth. Referring now to FIGS. 19–23 inclusive, the steps are illustrated wherein the wax tracings are converted to tracings in a low fusing metal substance.

FIGURE 19 illustrates a cross sectional view through the upper tracing plate with the completed tracings formed in wax in bodies of tracing material 302 and 304 as seen in this figure.

Referring now to FIG. 20, the open holes formed through the tracing plate are first filled with a suitable material 320 such as clay or the like. A large body of plaster indicated by reference numeral 324 is then poured in the position illustrated so as to substantially surround and conform to the configuration of the final tracings formed in the wax.

The body of plaster 324 is then removed from its position adjacent to the tracing plate 126, and the wax tracings are removed by melting the wax which may for example be accomplished by immersing the tracing plate in boiling water.

The support portions secured to the tracing plate are also suitably removed by heating and burning off the guide portion material including the elongated rigid members incorporated in the guide portions.

Referring now to FIG. 21, a back-up plate 328 is disposed over the tracing plate as illustrated, and the body of plaster 324 is again placed in the proper operative position as shown, these various components being suitably secured to one another as by wiring them together or the like.

Referring now to FIG. 22, a low temperature fusing metal is poured into the openings between the plaster body 324 and the tracing plate so as to form the two bodies 330 and 332 as illustrated in this figure, it being understood that a third body would be formed as shown in FIG. 24 and as illustrated by reference numeral 334. Each of these bodies of metallic substance has formed therein the accurate reproduction of the final traces as indicated by reference numerals 330′, 332′ and 334′ respectively, and the tracing plate and the final traces are then ready to be employed in the final steps of the method. This final form of the tracing plate is also illustrated in FIG. 23.

As an alternative method of forming the final traces, the tracing material applied to the upper tracing plates as shown in FIG. 10 may comprise a self-setting plastic instead of employing a dental compound and wax arrangement as previously described. If a relatively fast hardening plastic is employed in conjunction with the upper tracing plate when it is mounted in the patient's mouth, the final tracings may be made in the mouth, and the substance subsequently allowed to harden wherein finished tracings are provided.

It will of course be apparent that any method of causing the tracings to ultimately be of a hardened fixed nature is suitable in the present method.

Referring now to FIG. 16 of the drawings, this view illustrates the conventional procedure of making a face bow record with the aid of a conventional face bow indicated generally by reference numeral 340 and including a bite fork 342 which is disposed in the patient's mouth in the usual manner. This procedure is well known, and the details of carrying this step out are not considered necessary for a description of the present invention.

Referring now to FIG. 17, the initial step is illustrated in employing the face bow record with a conventional articulator indicated generally by reference numeral 350 whereby the upper full arch model is mounted upon the articulator.

As seen in FIG. 17, the bite fork 342 of the face bow is supported upon a piece of material 352 which may comprise clay or the like which in turn is supported on a portion 354 of the base 356 of the articulator.

The conventional incisal guide table 358 is mounted on base portion 356 and is adapted to cooperate with the incisal pin 360 which in turn is supported by the upper part 362 of the articulator which is pivoted for movement into an upper position as shown for receiving the means for mounting the upper model thereon. This articulator is of conventional well known construction, and the details of construction thereof are not considered necessary for a description of the present invention.

Referring now to FIG. 18, after the face bow is properly oriented with respect to the articulator as illustrated, the upper full arch model 100 is supported in proper operative position with the use of the bite fork of the face bow, and the full arch model is then removably attached to the articulator as hereinafter described.

As seen in FIG. 18, a generally disc-like member 370 includes a stud portion 372 extending through a hole formed in the portion 362 of the articulator, a suitable nut member 374 being threaded on the outer end of stud 372 for holding member 370 in operative position.

A body of plaster or similar material 376 is poured in place so as to extend into holes 378 provided at spaced portions of member 370 whereby the body of plaster is retained in the operative position shown.

An upper member 380 of a split mounting plate arrangement is keyed to the body of plaster 376 since the plaster extends beneath the sloping edge portions of the split mounting plate 380 to hold the mounting plate in operative position.

The lower member 384 of the split mounting plate arrangement is fixed to the upper portion of the upper full arch model 100 by a body of plaster 380, and a tapered locking pin 390 extends within cooperating grooves formed in the split mounting plates 380 and 384 to hold the plates in the operative relationship shown. When the tapered locking pin 390 is removed from such grooves, the split mounting plates can be readily separated from one another, thereby permitting the upper full arch model to be removed from the articulator when so desired. As seen in FIG. 18, the posts 234' associated with the upper full arch model are substantially identical to the posts 234 previously described in connection with the lower full arch model.

Turning now to FIG. 18a, the subsequent step in the method is illustrated. As seen in this figure, the upper full arch model is illustrated in the mounted position shown in FIG. 18. Once the upper full arch model has been so mounted in operative position, the lower full arch model is then mounted in operative position with the aid of a centric record 400 which is made preferably at the same time as the face bow record is made as illustrated in FIG. 16. This centric record 400 is placed in the position shown so that the tooth representing portions of the upper and lower full arch models will fit properly within the indentations in the centric record to thereby align the lower arch model properly with respect to the upper arch model.

When the lower arch model has been properly positioned as shown in FIG. 18a, it is secured to the base portion 356 of the articulator.

The member 354 is of substantially the same construction as the member 370 previously described and includes a threaded stud portion 404 extending through a suitable hole provided in the base portion and having a threaded nut 406 threaded thereon for securing member 354 in the operative position illustrated.

A body of plaster 410 is keyed to member 354 by filling the tapered holes 412 formed therein, the body of plaster 410 also extending around the tapered edges of a split mounting plate 414 to hold this mounting plate in the position shown.

A further split mounting plate 416 is provided and is secured by a body of plaster 418 to the undersurface of the lower full arch model 102. A tapered locking pin 420 extends within aligned grooves provided in the two latter mentioned split mounting plates for securing them in the operative position illustrated. The tapered locking pin permits the lower full arch model to be removed when desired.

When the upper and lower full arch models are mounted in the articulator as shown in FIG. 18a, one can check that the teeth on the model contact one another properly in a centric relationship. The upper and lower arch models can be removed and manually manipulated as hereinafter described, and from time to time again mounted in operative position as shown in FIG. 18a to check that the centric relationship is proper.

Referring now to FIG. 25, the models are illustrated in the hands of a person who is to build up the finished shape of the teeth. The tracing plates have ben re-attached to the models, whereas they were illustrated as removed from the models in FIGS. 18 and 18a.

With the models held in the hands as illustrated in FIG. 25, the models are pressed together and pressure is applied particularly to push the lower model upwardly and rearwardly so as to make sure that the upper ends of the studs seat in the cavities defined by the final tracings on the upper tracing plate.

The final tooth surfaces are built-up with casting wax while manipulating the models through all the desired relative movements of the models and observing and detecting interference or the lack of proper contact for the desired tooth formation. The teeth are then shaped by adding or removing wax to obtain the desired shape. The same results can also be obtained by carving away a standard denture tooth.

This manual manipulation of course permits considerable degree of freedom of movement of the models so that the models are adapted to move through substantially all of the actual movements of the jaws themselves.

It is apparent from the foregoing that there is provided according to the present invention a new and novel method for making dental restorations wherein tracings of all of the desired jaw movements are taken directly in the mouth of the patient resulting in quite accurate final tracings. Since these final tracings are then used while manipulating the models in the hands of personnel making the final tooth surfaces, the final results are such that greater accuracy is obtained in building up the final tooth surfaces in accordance with actual movements of the jaws. The method may be carried out much quicker than prior art methods and the final manipulation of the models in the hands permits the operator to more readily see any possible interference or lack of proper contact of the surfaces of the teeth.

It will of course be understood that after the finished tooth surfaces are formed on the models, the final surfaces for the living teeth are cast from the models, these final surfaces being in the form of gold or the like which are actually applied to the living teeth in the patient's mouth.

I claim:

1. The method of making a dental restoration comprising making upper and lower full arch models of a patient's teeth, making a centric record of the patient's teeth, mounting said models on an articulator using said centric record to properly align the models, providing upper and lower tracing plates, the lower tracing plate having a plurality of studs extending therefrom, attaching said upper tracing plate to said upper model and said lower tracing plate to said lower model with said tracing plates in spaced relationship from one another, providing guide portions secured to each of said plates and engaging and conforming to adjacent parts of the associated models for accurately positioning said plates with respect to the associated models, removing said plates from said models, securing tracing material to the undersurface of said upper plate, placing said plates in the patient's mouth with the guide portions secured to said plates in register with the patient's teeth to accurately position the plates relative to the patient's teeth, maintaining said plates in proper position relative to the patient's teeth, making the desired movements of the patient's jaws with said studs extending into said tracing material to create a trace pattern in said trace material, obtaining a final trace, again attaching said upper plate to the upper model and said lower plate to the lower model, manually manipulating said models with said studs seated in said final traces to guide the movement of said models with respect to one another, checking said models for centric relation contact from time to time and forming the finished tooth surfaces on said models while so manipulating and checking said models.

2. The method as defined in claim 1 including the step of providing spacer means on the ends of said studs for properly spacing said upper and lower plates from one another when attaching said plates to said models.

3. The method as defined in claim 2 wherein said plates are initially attached to the associated models by removable material to hold the plates in proper spaced relationship from one another.

4. The method as defined in claim 3 including the step of tacking each of said plates to the associated model with tacking material after the plates are attached to the associated models with said removable material to enable the plates to be properly positioned on the associated models.

5. The method as defined in claim 4 wherein portions of said plates are first lubricated before placing said tacking material in place to enable ready separation of said plates from said tacking material.

6. The method as defined in claim 4 including the step of subsequently removing said removable material and then repositioning said plates in place on the associated models with the use of said tacking material to enable accurate positoning of the plates.

7. The method as defined in claim 6 including the subsequent step of marking points on each of said models for properly securing the plates in place thereon.

8. The method as defined in claim 7 including the step of then forming holes in each of said models in accordance with the marks placed on the models.

9. The method as defined in claim 8 including the subsequent step of fixing posts in said holes.

10. The method as defined in claim 9 including the step of attaching each of said plates to the posts secured to the associated model prior to fixing the posts in said holes.

11. The method as defined in claim 1 including the step of first filling in the undercut portions of the teeth on each of said models before providing said guide portions secured to each of the plates and engaging and conforming to the adjacent teeth parts of the associated model to prevent the guide portions from becoming locked to parts of the associated models.

12. The method as defined in claim 1 including the step of first lubricating the parts of said models which are engaged by said guide portions to prevent said guide portions from sticking to said parts of the models.

13. The method as defined in claim 1 wherein after said plates with the guide portions secured thereto have been removed from said models, the plates are first placed in the patient's mouth with the guide portions in register with the teeth of the patient's mouth and are held in such position and any interference of said plates or the guide portions is trimmed off so that all lateral and eccentric excursions of the jaws of the patient are accommodated.

14. The method as defined in claim 1 wherein said final trace is obtained by first creating an initial trace pattern in the trace material on said upper plate, then taking the upper plate from the patient's mouth and removing part of the trace material.

15. The method as defined in claim 14 including the further step of adding a final trace material within each of the trace patterns defined within the trace material on said upper plate.

16. The method as defined in claim 15 including the further steps of again placing said upper plate within the patient's mouth and making the desired movements of the patient's jaws to creat ethe final trace in said final trace material.

17. The method as defined in claim 1 wherein after obtaining the final trace, said plates are removed from the patient's mouth and the guide portions secured to each of the plates are removed therefrom.

18. The method as defined in claim 1 wherein the step of checking for centric relation contact of the models includes the step of making a face bow record with respect to the patient.

19. The method as defined in claim 18 including the additional step of making a further centric record of the patient's teeth.

20. The method as defined in claim 18 including the further step of mounting said upper model on an articulator with the aid of said face bow record.

21. The method as defined in claim 20 including the step of making a further centric record and using said further centric record to mount the lower model on said articulator so as to be in proper register with respect to said upper model on said last-mentioned articulator.

22. The method as defined in claim 1 including the steps of providing spacers on said studs and securing said plates to the respective models with removable material and in proper spaced relationship to one another, lubricating portions of said plates and tacking said portions of the plates to the associated models with tacking material, then removing said removable material and repositioning said plates on the associated models with the aid of said tacking material, then marking said models at proper positions for forming holes therein, then forming holes in the respective models, attaching said plates to posts, then securing said posts in said holes, said plates after being initially removed from said models being placed in the patient's mouth with the guide portions in register with the teeth of the patient and any interference of the plates or guide portions being trimmed off so that all lateral and eccentric excursions of the jaws are accommodated, said step of checking for centric relation contact of the models including the steps of making a face bow record and a further centric record, mounting the upper model on an articulator with the aid of said face bow, using said centric record to mount said lower model on said last-mentioned articulator in proper register with respect to the upper model thereon, and utilizing said last-mentioned articulator for checking said centric relation contact of the models.

23. The method as defined in claim 1 wherein the step of maintaining said plates in proper position relative to the patient's teeth includes the step of applying continuous pressure to the upper and lower tracing plates by providing a spring between and in engagement with the upper and lower plates.

24. Apparatus for making dental restorations comprising an upper tracing plate, said upper tracing plate having a first plurality of holes formed therein, support portions mounted in said first plurality of holes and extending laterally outwardly of said upper tracing plate, said upper tracing plate having a second plurality of holes formed therein, tracing material mounted by said second plurality of holes and supported at the underside of said upper tracing plate, said upper tracing plate having a further plurality of holes formed therein for receiving attaching posts to attach said upper tracing plate to an upper full arch model, a lower tracing plate, said lower tracing plate having a third plurality of holes formed therein, support portions mounted by said third plurality of holes and extending laterally outwardly of said lower tracing plate, said lower tracing plate having a fourth plurality of holes formed therein for receiving attaching posts to attach the lower tracing plate to a lower full arch model, and a plurality of studs on said lower tracing plate and extending from the upper surface thereof.

25. Apparatus as defined in claim 24 including means on the facing surfaces of said upper and lower tracing plates for receiving and supporting one end of resilient means extending between said upper and lower tracing plates.

26. Apparatus as defined in claim 25 wherein said receiving and support means on each of said tracing plates includes a recess for receiving one end of a spring.

27. Apparatus as defined in claim 24 wherein the outer terminal ends of each of said studs is of rounded configuration.

28. Apparatus as defined in claim 27 wherein said outer terminal ends of the studs define portions of spherical surfaces.

29. Apparatus as defined in claim 24 wherein said means for mounting support portions and for mounting tracing material on said upper tracing plate comprises holes formed in said upper tracing plate, said upper tracing plate also having a recessed portion for receiving one end of a spring.

30. Apparatus for making dental restorations comprising an upper tracing plate, said upper tracing plate including means for mounting support portions thereon, means for mounting tracing material thereon and means for attaching said upper tracing plate to an upper full arch model, a lower tracing plate, means on said lower tracing plate for mounting support portions, means for attaching the lower tracing plate to a lower full arch model, and a plurality of studs on said lower tracing plate and extending from the upper surface thereof, each of said studs on said lower tracing plate extending upwardly at an acute angle in a rearward direction with respect to said lower tracing plate.

31. Apparatus for making dental restorations comprising an upper tracing plate, said upper tracing plate including means for mounting support portions thereon, means for mounting tracing material thereon and means for attaching said upper tracing plate to an upper full arch model, a lower tracing plate, means on said lower tracing plate for mounting support portions, means for attaching the lower tracing plate to a lower full arch model, and a plurality of studs on said lower tracing plate and extending from the upper surface thereof, said plurality of studs including at least three studs extending upwardly at an acute angle from said lower tracing plate, each of said studs having a terminal end portion defining a portion of a spherical surface.

References Cited

UNITED STATES PATENTS

| | | | |
|---|---|---|---|
| 1,734,398 | 11/1929 | Phillips | 32—19 |
| 2,245,288 | 6/1941 | Moylan | 32—19 |
| 2,562,106 | 7/1951 | Leathers | 32—19 |

ROBERT PESHOCK, Primary Examiner